US005374475A

United States Patent [19]

Wälchli

[11] Patent Number: 5,374,475

[45] Date of Patent: Dec. 20, 1994

[54] RECORD CARRIER FOR THE RECEIPT OF COLORING MATERIALS

[75] Inventor: Peter C. Wälchli, Schönenberg, Switzerland

[73] Assignee: Celfa AG, Seewen, Switzerland

[21] Appl. No.: 78,435

[22] Filed: Jun. 16, 1993

[30] Foreign Application Priority Data

Jun. 20, 1992 [EP] European Pat. Off. ........... 92110449

[51] Int. Cl.[5] ........ B32B 9/00

[52] U.S. Cl. ........ 428/304.4; 428/306.6; 428/308.4; 428/409; 428/131

[58] Field of Search ........ 428/304.4, 306.6, 308.4, 428/409, 131

[56] References Cited

U.S. PATENT DOCUMENTS

| | | | |
|---|---|---|---|
| 3,870,549 | 3/1975 | Ruygrok | 117/73 |
| 4,460,637 | 7/1984 | Miyamoto et al. | 428/212 |
| 4,496,629 | 1/1985 | Haruta et al. | 428/341 |
| 5,084,334 | 1/1992 | Hamano et al. | 428/304.4 |
| 5,173,363 | 12/1992 | Fitch | 428/304.4 |

FOREIGN PATENT DOCUMENTS 63126791 3/1982 Japan .

OTHER PUBLICATIONS

Patent Abstracts of Japan vol. 12, No. 376 (M-750) 1988.

*Primary Examiner*—Patrick J. Ryan
*Assistant Examiner*—Kam F. Lee
*Attorney, Agent, or Firm*—Ladas & Parry

[57] ABSTRACT

The uppermost, porous layer consists of a filler material free plastic material, of which the particles are melted together at their mutual contact areas. This forms capillaries, through which the coloring material is transported downwards. A receiving layer for the respective color material, which penetrates thereinto capillarily by diffusion, is located under the porous upper layer. These two layers lie on a supporting layer.

Because during a printing the coloring material is transported capillarily through the uppermost layer to the middle layer, an immediate drying at the surface of the record carrier occurs. A lateral spreading, i.e. running of the coloring material, does not occur. Thus no smudged areas are formed and the pictures are of an excellent brilliancy.

3 Claims, 1 Drawing Sheet

RECORD CARRIER FOR THE RECEIPT OF COLORING MATERIALS

BACKGROUND OF THE INVENTION

1. Field of the Invention

The present invention relates to a record carrier for the receipt of coloring materials for a recording of pictures and information, including a planar supporting layer and at least one porous layer located on at least one side thereof.

2. Description of the Prior Art

Generally known record carriers of the kind referred to above which comprise materials or are coated with materials, resp., which allow a recording by means of inks, toners, India inks and similar coloring materials are structured in such a manner that mentioned coloring materials are fixed into the respective material in case of India inks and toners by an adsorption at the surface or in case of inks by diffusion and in case of paper and nonwoven materials by the capillary effect. Coloring materials, in which the color is not dissolved and rather is dispersed in form of tiny solid material particles in a solvent such as e.g. the case with toners or India inks, remain therefore at the surface of the record carrier and accordingly the resistance against a rubbing off of the corresponding record is unsatisfactory.

A first precondition that the liquid medium, i.e. the coloring materials can diffuse into a layer of a record carrier is that this material features a high wettability. If this precondition is fulfilled, attention must be paid to the fact that diffusion processes are slow processes, i.e. a diffusing of India inks into a surface layer of a record carrier necessitates a certain duration of time, during which the material diffusing into such layer is obviously still or must be, resp., still in a flowable state. In other words, a certain time elapses until the complete drying of the ink, such that when handling such a record carrier, the record may smear. Furthermore, the slow drying process due to the correspondingly continued diffusion into the respective surface layer leads also to a lateral spreading of the liquid diffusing thereinto, with the consequence that the recorded picture, i.e. the recorded picture points or dots, resp., disperse or run, resp., and the dot resolution of the respective printing decreases rapidly.

The sheet shaped record carriers for xerographic black/white and also color copying apparatus lead specifically due to the silica oils used as adhesive agent to smutty surface layers. The copies resulting therefrom are in such cases unsightly and the handling thereof is troublesome.

If the record carrier consists of paper or a similar fibrous material or if the record carrier contain such materials, resp., the coloring materials e.g. inks are sucked up by a capillary effect between the fibers and will dry there. This capillary effect does indeed insure on the one hand a speedy absorbing of the liquid coloring materials, features, however, on the other hand the drawback that due to the capillaries extending horizontally relative to the surface of the sheet the resolution is quite negatively influenced by a running of the ink along the paper fibers.

SUMMARY OF THE INVENTION

Therefore, it is a general object of the present invention to provide a record carrier, in which a speedy drying occurs by a utilizing of capillary forces such as in case of paper and in which due to the capillary, pore or cell structures extending perpendicularly to its free surface and having an exactly predeterminable size an optimal, constant resolution of the picture dots is insured.

A further object is to provide a planar record carrier for the receipt of coloring materials, in which the porous layer is comprised of a micro-porous layer consisting of a thermoplastic plastic material free of filler materials and which includes capillaries and pores, resp., extending at least approximately perpendicular to the exposed surface of the micro-porous layer.

The advantages gained by the invention are substantially that the micro-capillarity obtained allows a fast drying, a selective wetting and the possibility of an encapsulating of the coloring material and accordingly a permanent protection of the respective printing or the contents of the information.

Depending on the production method, the thickness of the micro-porous layer and the selection of the supporting layer the record carrier may be opaque, semitransparent or transparent.

The micro-porous layer allows a discriminating between the various liquids or gases used for the printing process due to a specifically selected polarity or surface tension, resp., at the surface of the microporous layer, namely a specific wettability or specific absorbing and adsorbing properties.

These properties are obtained by a corresponding selection of the thermoplastic plastic material, i.e. polymer for the porous layer, such as will be explained in detail further below.

The production of layers of polymers free of filler materials and a porous structure is as such known in the technology for producing membranes. Surprisingly and in accordance with the invention it has been recognized that layers having capillaries or hollow spaces which are oriented perpendicularly to the surface such as known in the membrane technology are not only suitable for printing and recording methods but feature also excellent drying properties and produce additionally a constant, extremely high picture dot resolution.

Depending on the selected polymer used the used solvent and a production method known in the membrane technology the desired capillarity or microporosity, resp., of the micro-porous layer is obtained by a growing together of hollow spaces, by forming an open-pore polymer matrix when passing over the limits of the solubility of the selected polymers in the solvent (mixture) or by a sintering together of individual polymer particles and further mechanisms, resp.

In contrast to known products the microporous structure of the micro-porous layer insures for this application on the one hand a very speedy drying of the coloring materials, in which the color is present dissolved in a solvent, such as e.g. in case of inks, and on the other hand also a vastly improved fixing of India inks and toners, in which the colors are not dissolved, but rather dispersed in form of small solid material particles in a solvent.

Furthermore, in each printing process an optimal resolution of the picture dots is insured by the inventive micro-porous structure of the micro-porous layer and the selection of the polymer used thereto. The running or smearing, resp., of ink drops (=picture dots) along the fibers or due to the chromatographic effect inside dense, so to say non-porous layers as is the case with the known record carriers, cannot occur at the inventive record carrier because the micro-porous layer contains neither filler materials nor fibers and the drying process of the coloring materials, specifically also of inks, does not proceed by diffusion.

Opaque and semitransparent micro-porous layers can, furthermore, be also changed after the printing into a transparent layer. Hereto the phase boundaries are eliminated, in that the respective layer is subjected to an influence of heat and/or of a solvent and/or of a pressure, wherewith a melting or a dissolving of the individual particles is caused. A further possibility of a transformation into a transparent layer consists in a filling of the capillaries of the micro-porous layer by a suitable solvent. These measures are commonly known for the person skilled in the art. The supporting layer consists in these cases obviously of a transparent material.

Because these inks and toners are now encapsulated inside of the micro-porous layer and are not adsorbed at the surface, such as is the case at the known record carriers, an increased durability of the corresponding picture is arrived at.

Furthermore, because e.g. inks are fixed in the capillaries of the micro-porous layer, an excellent, durable resolution capability of the record carrier is arrived at.

The inventive record carrier can be used for all presently known recording technologies and independently from a respective form (poster, transparent pictures, slides, etc.). The record carrier can be used, for instance, for a manual drawing, e.g. by a felt marker, ball-point writing utensil, by plotter apparatuses such as pin-plotters or ink jet-plotters or -printers, resp., with CAD-recording apparatuses. The record carrier finds also excellent application for copying processes (e.g. xerographic process), in black/white copying apparatuses and color copying apparatuses. The record carrier lends itself also for excellent use in the printing technique, e.g. for a thermotransfer, thermo-diffusion, ink jet-printing, matrix-, offset- and flexoprinting.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
FIG. 1 illustrates schematically a section through a paper or nonwoven in order to illustrate the extent of the fibers.

FIG. 1 illustrates schematically and on a vastly enlarged scale a section through a paper, i.e. a sheet of paper or a nonwoven sheet, in order to illustrate the extent of the fibers of a record carrier structured in accordance with the prior art and to explain its drawbacks.

Due to the processing during the production of such sheets the larger part of the fibers lie horizontally oriented such that the capillaries extend predominantly horizontally. The capillaries formed by the fibers 4 are much longer than the picture dots produced during the printing. The capillary effect insures on the one hand and such as mentioned above a speedy receiving or absorbing, resp., of the respective liquid coloring material, however, on the other hand the coloring material flows predominantly along the horizontally oriented paper fibers such that the resolution of the print is influenced negatively.

Figure 2:
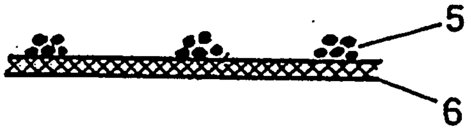
FIG. 2 is a section through a nonporous layer with picture dots printed thereupon.

A further design of a known record carrier structured in accordance with the prior art is illustrated in FIG. 2. The record carrier 6 is here e.g. a enamelled or coated paper or a coated foil, a thick layer having no pores. The individual picture dots are identified by the reference numeral 5. In case of inks, i.e. all coloring materials, in which the color is dissolved in a solvent, the coloring material enters slowly into the layer by a diffusion or chronomatographic action, resp.

If the color is dispersed in a liquid such as is the case in toners or India ink, it remains at the surface giving rise to the also above mentioned drawbacks.

Figure 3:
FIG. 3 illustrates a micro-porous layer structured in accordance with the invention and composed of particles.

According to one embodiment of the invention which is schematically illustrated in FIG. 3, the micro-porous layer consists now of individual particles, which are arranged relative to each other in such a manner that capillaries are present which extend perpendicularly relative to the free surface, i.e. the surface which is to be printed. Accordingly, the coloring material 8 can speedily penetrate into the layer. It is also to be noted that the capillaries, through which the coloring material penetrate into the layer, have a smaller diameter than the picture dots.

Figure 4:
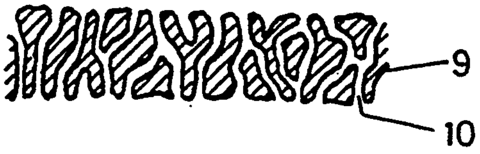
FIG. 4 is a micro-porous layer in accordance with the invention with a sponge-like structure.

A further embodiment of the invention, which is illustrated specifically in detail and is known in the field of the membrane technology, is illustrated in FIG. 4. Elongated capillaries 10 extend through the plastic material layer 9, which capillaries 10 run again perpendicularly to the free surface of the layer 9.

Figure 5:
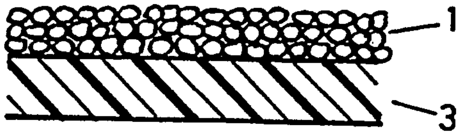
FIG. 5 is a section through a record carrier of a first embodiment having a micro-porous layer located on a supporting layer.
Figure 6:
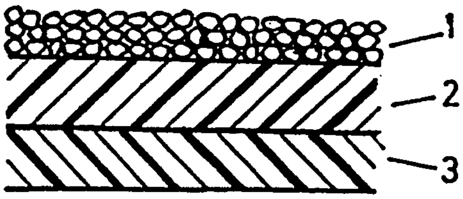
FIG. 6 is a section through a record carrier of a second embodiment, having a micro-porous layer, a receiving layer located underneath and a supporting layer.

Based on FIGS. 5 and 6 concrete practical embodiments of the invention will be described below.

The planar supporting layer 3, on which the micro-porous layer 1 made in accordance with the invention is placed directly or indirectly, is for instance a sheet of paper or a polyester-foil, depending on the respective use. It is, for instance, to be noted that as planar supporting layer paper will be used rather for opaque pictures and polyester rather for semi-transparent and transparent pictures.

In order to produce the porous layer 1 on the supporting layer 3 thermoplastic polymers are used, which are present in form of aqueous or nonaqueous dispersions or suspensions, of colloidal solutions in solvents or water.

Examples of such thermoplastic polymers are: polyacrylates, polymethacrylates, polyacrylamides, polyesters, polyamides, polyurethanes, olefine-polymerisates, styrene-(co-)polymerisates, vinylacetate(co)polymers, polyvinylalcohols, polyvinyl-ethers, polyvinylic-pyrrolidones, polyethylenoxides, vinylchloride- or vinyliden-chloride-(co-)polymerisates, resp., and maleic acid anhydride-based and fluor-containing polymers, acetal resins and polyoximethylenes, cellulose-ethers and -esters.

Also suitable are modifications of these polymers and co-polymerisates, resp., of the monomers used in these polymers.

Accordingly, also polymers which are dissolvable in water- and/or in organic solvents are used for the production of the porous layer 1.

The selection of the polymer for the microporous layer influences the printability and the printing results of the record carrier. In the practical, commercial embodiments of the invention the chemical composition and accordingly the polarity of the porous layer, the hydrophilic property and hydrophobic, resp. property and accordingly the wettability of the porous layer 1 is selected by a corresponding selection of a polymer dependent on a respective recording process, such as e.g. xerographic process, thermotransfer printing, thermodiffusion printing, ink jet printing, matrix printing, etc., in order to influence more or less the final result of the printing.

In recording processes such as dry-toner-xerographic processes and thermotransfer-printing processes, i.e. processes operating with "dry coloring materials" the influence of the respectively selected polymer is relatively low.

However, in case of recording processes which operate with liquid toners and inks, i.e. for instance of ink jet printing or liquid-toner-xerographic-processes, the influence of the selection of the polymer is large. At these last named printing processes the quality of the final print is decisively influenced by the wettability properties of the surface of the layer by the respective inks and liquid toners.

Therefore, it is now also possible to provide selectively wettable, writable and printable surfaces such that embodiments of the invention are of specific interest in the field of safety papers. It is also to be noted, that a respective porous layer 1 can be coated on both sides of a given planar supporting layer 3.

At a first embodiment the record carrier consists accordingly of a correspondingly suitable planar supporting layer 3, onto which a porous layer 1 is placed at a thickness of 0.1–150$\mu$, preferably 0.1–50$\mu$.

According to a second embodiment it consists of a planar supporting layer 3, onto which an ink receiving layer 2 is placed, onto which in turn the described porous layer 1 is applied at a thickness of 0.1 to 50$\mu$, preferably 1 to 30$\mu$.

The second embodiment, which thus comprises a double layer assembly on the supporting layer 3, is specifically suitable for recording processes involving liquid recording mediums such as inks, liquid toners, etc.

The porous uppermost or cover, resp., layer 1, i.e. the uppermost layer, causes due to its capillary suction capability a speedy drawing off of the ink or liquid toner, resp., placed thereupon and accordingly a fast drying of the surface, and furthermore the opacity of this porous layer 1 increases after the ink or toner, resp., coloring materials have diffused into the receiving layer 2 located thereunder, the brilliance of the colors and color depth of the respective print, specifically when the printed picture is viewed through a transparent supporting layer 3.

The receiving layer 2 under the porous cover layer 1 increases the total absorption capacity for inks, liquid toners, etc. to a large degree. After the ink, the liquid toner has been sucked after the printing of the surface immediately into the capillaries of the porous cover layer 1, the color present in the ink or toner diffuses into the receiving layer 2 located thereunder. Because conclusively the capacity of the total record carrier for absorbing liquid is increased, the porous cover layer 1 can be made here considerably thinner than in case of the first embodiment. Because now the cover layer 1 of the second embodiment, which as such is opaque, can be made thinner at the same absorption capacity of the total record carrier, it is also possible to transfer this porous layer 1 in accordance with as such known processes at a small expenditure on energy (heat, pressure) from an opaque state into a transparent state.

It is also possible to encapsulate the respective coloring material in the porous layer 1 by means of known processes and thus to permanently protect this material.

At both embodiments the planar supporting layer 3 can be made basically from any kind of material.

The opaque material may be paper or opaque films or foils, resp., of polyester, polycarbonate, polypropylene, triacetate, polyvinylchloride, etc.

When the opaque, porous cover layer 1 for an increase of the color brilliancy and color depth of the record, e.g. of a picture, if the picture is viewed through the supporting layer 3, is transferred from the opaque state into a transparent state, a transparent supporting layer 3 must obviously be selected. Depending on a respective application it is possible to select hereto films or foils, resp., of polyester, polycarbonate, triacetate (triacetylcellulose), polypropylene, polyvinylchloride, cellophane, polyamide, polysulfon, polyphenylenesulfide, polyimide, etc.

In the following some embodiments of the record carrier will be described, specifically the production of same.

EXAMPLE 1

Record carriers having a support and a porous layer placed directly thereupon, suitable for xerographic recording:

10 g of a thermoplastic polyamide-resin having a softening point of 105°–110° C. were dissolved in 90 g ethanol and 45 g n-hexane by agitating at room temperature in a 3-throat-bulb of a capacity of 250 ml. After the dissolving process ended pure ethyl acetate in an amount of 100 ml was dripped in during 10 minutes at an extensive agitating of the solution. Thereby an almost quantitative precipitation of the polymer used occurred and a suspension of microscopically small polymer-particles resulted thereout.

This polymer-suspension was coated by means of a doctor blade onto a not treated polyester-foil used as planar supporting layer 3, such that after the evaporating of the solvents at 100° C. a micro-porous, opaque layer having a thickness of 10 micron was produced.

This record carrier was printed by means of a xerographic process.

An excellent picture quality and an excellent adherence of the toner was produced. Specifically, no difficulties regarding a smudgy surface layer were encountered, which arise usually by the silicate oil-adhesive agents used in the corresponding copying apparatuses. The reason for this positive result is that the silicate oil has been pulled directly into the capillaries of the porous layer.

In a sense of an additional variant the printed and opaque layer 1 was subjected to a heat treatment, in that it was exposed during 10 minutes to a temperature of 150° C., such that the porous layer 1 was made transparent. Thus, the entire printed sheet (with the supporting layer of a polyester foil) got transparent. And additionally, the toner particles were irreversibly fixed due to this heat treatment through a melting in the layer.

EXAMPLE 2

Record carriers with a supporting layer 3 and a porous layer 1 placed directly thereupon by means of a phase inversion process, suitable for xerographic recordings:

10 g of a thermoplastic copolymer-resin with a Tg of 55° C. were dissolved in 57 g of a 1:1 mixture of ethylenic alcohol/water at a strong agitating.

After the dissolving was terminated, an untreated polyester foil was coated by the above described lacquer by means of a doctor blade such that a thickness of the dry layer of 1.2 micron was obtained.

Also this record carrier was printed by means of a xerographic process. The properties of the picture were the same as described above with reference to example 1.

Again the printed, opaque record carrier was made transparent by a heat treatment, here 6 minutes at 70° C. without suffering on quality.

The same example was repeated, whereby, however, in place of the untreated polyester foil a commercially available paper sheet was used as supporting layer 3. The result was also excellent. Obviously the transferring into a transparent state was not made in this example.

EXAMPLE 3

Record carrier, in which a receiving layer 2 for a coloring material is located between the supporting layer 3 and the porous layer 1, suitable for an ink jet printing process:

The polymer solution described in example 2 was selected as porous layer 1 to be coated onto a supporting layer. In place, however, of the untreated polyester foil according to example 2 a transparent, coated foil material which is suitable for being printed by means of an ink jet printing process was used. It consists of a planar supporting layer 3 and a receiving layer 2 placed thereupon. Such foil material is sold e.g. by the Folex Company under the name BG 31.

This ink jet-printing-foil material was coated by a polymer solution as described in example 2 and by a same process, whereby the porous layer 1 was an opaque layer having a thickness of the dry layer of 3.5 micron.

This record carrier consisting of a planar supporting layer 3 and two layers 1, 2 arranged thereupon was printed by a commercially available ink jet printer. The printed ink dried immediately because due to the capillary absorbing capability of the upper porous layer 1 the ink was absorbed immediately and diffused into the supporting layer 2 located thereunder such that contrary to the until now known record carriers no smudging of the ink occurred directly after a wiping of the surface by a finger or cloth immediately after the printing.

A testing of the resulted print revealed that it corresponded to the maximally obtainable resolution of the used ink jet printing apparatus. The printed picture viewed through the transparent supporting layer had an extraordinarily brilliance. (It is to be noted that the deposited porous layer formed the white background.)

Thereafter, the printed record carrier was again exposed to a heat treatment (15 minutes at 170° C.). A completely transparent foil with an unchanged quality of the picture resulted, which allowed a projecting onto e.g. a screen with an excellent picture.

While there are shown and described present preferred embodiments of the invention, it is to be distinctly understood that the invention is not limited thereto, but may be otherwise variously embodied and practiced within the scope of the following claims.

I claim:

1. A planar record carrier for the receipt of coloring materials for a recording of pictures and information, said record carrier comprising a planar supporting layer having a plurality of sides and at least one porous layer located on at least one side of the planar supporting layer, said at least one porous layer having an exposed surface and an opposite surface facing the supporting layer, said porous layer comprising a micro-porous layer consisting of a thermoplastic polymer free of filler materials and including capillaries and pores, said capillaries and pores extending at least approximately perpendicular to the exposed surface of the micro-porous layer.

2. The planar record carrier of claim 1, wherein an absorbing layer of a material which absorbs the coloring materials is located between the planar supporting layer and the micro-porous layer.

3. A planar record carrier for the receipt of coloring materials for recording pictures and information, said record carrier comprising a planar supporting layer having a plurality of sides and at least one porous layer located on at least one side of the planar supporting layer, said at least one porous layer having an exposed surface and an opposite surface facing the supporting layer, said porous layer consisting essentially of a thermoplastic polymer or polymers and being free of filler material, said thermoplastic polymer or polymers having a micro-porous structure and forming capillarities in said porous layer which extend at least approximately perpendicular to the exposed surface of the at least one porous layer, said thermoplastic polymers or polymers being susceptible to softening upon application of heat and pressure such that the micro-porous structure can be eliminated by the application of heat and pressure whereby said at least one porous layer can be transformed into a dense material structure without pores in which the coloring materials are permanently embedded and fixed.

* * * * *